(12) United States Patent
Legg et al.

(10) Patent No.: US 9,706,490 B2
(45) Date of Patent: Jul. 11, 2017

(54) METHOD FOR ENERGY SAVING IN A CELLULAR COMMUNICATION SYSTEM

(71) Applicant: Huawei Technologies Co., Ltd., Shenzhen (CN)

(72) Inventors: Peter Legg, Kista (SE); George Koudouridis, Kista (SE); Henrik Lundqvist, Kista (SE); Henrik Olofsson, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

(21) Appl. No.: 14/657,941

(22) Filed: Mar. 13, 2015

(65) Prior Publication Data
US 2015/0189589 A1 Jul. 2, 2015

Related U.S. Application Data

(63) Continuation of application No. PCT/EP2012/068134, filed on Sep. 14, 2012.

(51) Int. Cl.
*H04W 52/02* (2009.01)
*H04L 12/24* (2006.01)
(Continued)

(52) U.S. Cl.
CPC ...... *H04W 52/0206* (2013.01); *H04B 7/0632* (2013.01); *H04L 41/0833* (2013.01);
(Continued)

(58) Field of Classification Search
CPC ..... H04W 24/10; H04W 52/00; H04W 52/02; H04L 12/2434; H04L 12/0833;
(Continued)

(56) References Cited

U.S. PATENT DOCUMENTS 8,107,397 B1   1/2012  Bagchi et al.
8,515,410 B1 * 8/2013  Bach ............... H04W 52/0206
                                                    455/418
(Continued)

FOREIGN PATENT DOCUMENTS

CN      101083616 A    12/2007
CN      102158927 A     8/2011
(Continued)

OTHER PUBLICATIONS

"3rd Generation Partnership Project; Technical Specification Group Radio Access Network; Study on Minimization of Drive-Tests in Next Generation Networks; (Release 9)," 3GPP TR 36.805, V2.0.0, Dec. 2009, 23 pages.
(Continued)

*Primary Examiner* — Warner Wong
(74) *Attorney, Agent, or Firm* — Slater Matsil, LLP

(57) ABSTRACT

The present invention relates to a method for energy saving in a cellular communication system, the cellular communication system including one or more clusters of cells. Each cluster includes one or more base stations and one or more mobile stations. The method includes exchanging, between base stations belonging to a first cluster, measurement information associated with mobile stations of the first cluster, and changing energy saving configuration for cells belonging to the first cluster based on the measurement information.

20 Claims, 5 Drawing Sheets

(51) Int. Cl.
*H04B 7/06* (2006.01)
*H04W 24/10* (2009.01)
*H04W 52/00* (2009.01)

(52) U.S. Cl.
CPC ............ *H04W 24/10* (2013.01); *H04W 52/00* (2013.01); *Y02B 60/50* (2013.01)

(58) Field of Classification Search
CPC ............ H04B 10/0775; H04B 10/0795; H04B 10/07955; H04B 10/564; H04B 17/101
See application file for complete search history.

(56) References Cited

U.S. PATENT DOCUMENTS

| 2010/0009694 | A1  | 1/2010 | Fischer |                |
|--------------|-----|--------|---------|----------------|
| 2011/0170466 | A1* | 7/2011 | Kwun    | H04W 52/0235   |
|              |     |        |         | 370/311        |
| 2013/0040625 | A1* | 2/2013 | Godin   | H04W 16/08     |
|              |     |        |         | 455/418        |
| 2014/0018057 | A1* | 1/2014 | Yu      | H04W 52/0206   |
|              |     |        |         | 455/418        |

FOREIGN PATENT DOCUMENTS

| CN | 102238561 A   | 11/2011 |
|----|---------------|---------|
| EP | 2355593 A1    | 8/2011  |
| WO | 2010129933 A1 | 11/2010 |
| WO | 2011041169 A1 | 4/2011  |
| WO | 2012000551 A1 | 1/2012  |

OTHER PUBLICATIONS

Chiaraviglio, L., et al., "Energy-Aware UMTS Access Networks," The 11th International Symposium on Wireless Personal Multimedia Communications, Sep. 8-11, 2008, 5 pages.

Chiaraviglio, L., et al., "Energy-Efficient Management of UMTS Access Networks," IEEE 21st International Teletraffic Congress, Sep. 15-17, 2009, 8 pages.

Gong, J., et al., "Traffic-Aware Base Station Sleeping in Dense Cellular Networks," IEEE 18th International Workshop on Quality of Service, Jun. 16-18, 2010, 2 pages.

Hunukumbure, M., et al., "Handover Mechanisms for Planned Cell Outage in Twin State Green Wireless Networks," IEEE 73rd Vehicular Technology Conference, May 15-18, 2011, 5 pages.

Jardosh, A.P., et al., "Towards an Energy-Star WLAN Infrastructure," IEEE 8th Workshop on Mobile Computing Systems and Applications, HotMobile, Mar. 8-9, 2007, pp. 85-90.

Koudouridis, G.P., et al., "Enablers for Energy-Aware Cooperative Decision and Control in Wireless Networks," IEEE 73rd Vehicular Technology Conference, May 15-18, 2011, 5 pages.

Litjens, R., et al., "Potential of Energy-Oriented Network Optimisation: Switching Off Over-Capacity in Off-Peak Hours," IEEE 21st International Symposium on Personal Indoor and Mobile Radio Communications, Sep. 26-30, 2010, pp. 1660-1664.

Lorincz, J., et al., "Energy Savings in Wireless Access Networks Through Optimized Network Management," IEEE 5th International Symposium on Wireless Pervasive Computing, May 5-7, 2010, pp. 449-454.

Marsan, M.A., et al., "A Simple Analytical Model for the Energy-Efficient Activation of Access Points in Dense WLANs," Apr. 13, 2010, 10 pages.

Telefónica Investigación y Desarrollo, "Analysis of Scenarios With Energy Saving Cells and Compensation Cells," 3GPP TSG RAN WG3 Meeting #73, R3-112468, Nov. 10-14, 2011, 5 pages.

Stamatelatos, M., "Energy-Efficient Cooperative Decision and Control Schemes," Cooperative and Self Growing Energy Aware Networks, FP7 Information & Communication Technologies, Consern Deliverable D3.3, V1.0 Aug. 31, 2011, 118 pages.

Yoo, J.W., et al., "A Cooperative Clustering Protocol for Energy Saving of Mobile Devices With WLAN and Bluetooth Interfaces," IEEE Transactions on Mobile Computing, vol. 10, No. 5, Apr. 2011, pp. 491-504.

Zhou, S., et al., "Green Mobile Access Network With Dynamic Base Station Energy Saving," Sep. 25, 2009, 3 pages.

\* cited by examiner

METHOD FOR ENERGY SAVING IN A CELLULAR COMMUNICATION SYSTEM

This application is a continuation of International Application No. PCT/EP2012/068134, filed on Sep. 14, 2012, which is hereby incorporated by reference in its entirety.

TECHNICAL FIELD

The present invention relates to a method for energy saving in a cellular communication system. Furthermore, the invention also relates methods in a base station, corresponding base station devices, a computer program, and a computer program product.

BACKGROUND

Cellular communication systems are designed for peak hour traffic despite the fact that the traffic activity in a certain area is high only during short periods of the day. Considering the traffic activity in a residential area, it is usually low during daytime when people have left homes for work while it increases in the evenings when people are at home. The opposite pattern prevails for the office area. In a heterogeneous network environment different infrastructures are differently utilized throughout the duration of a day, e.g. macro cells are serving traffic in a residential area during working hours while a vast amount of the traffic is carried by pico or femto cells during evenings and late hours. At the opposite end of the city in the working areas these indoor femto cells or outdoor pico cells that provide indoor coverage are not fully utilized at the end of business days or during evenings and nights. In all cases under-utilization of the radio infrastructure and radio resources is a waste of power and significant power savings could be achieved by reducing the number of radio resources that the network provides in time, space and frequency, e.g. by switching off a number of base stations at different tiers (micro, pico, femto, etc.).

One of the simplest approaches to obtain energy efficiency is based on the activation of network resources on demand, thus avoiding to always power on all the resources that are necessary to serve the mobile users during peak traffic periods. This necessitates the implementation of a power on/off strategy that refers to the switching of radio infrastructure nodes and cells of a radio network. The radio network could be a heterogeneous network (HetNet) consisting of sites with different power transmission, coverage and capacity profiles. One of the key optimization problems in such HetNet scenario is to maximize or maintain user throughput and coverage at a minimum of energy consumption cost.

One prior art solution proposes an iterative algorithm based on a simulated-annealing search. The algorithm is centralized meaning that it executes in a single point using information about all base stations and all mobile users in the network. The centralized approach has the following drawbacks:

does not scale well to large networks with thousands of base station nodes and ten thousands of mobile users since (a) optimization complexity may be too great, (b) there will be more local maxima so there is a higher risk that the optimization algorithm chooses one of these, and (c) the gain matrix becomes very large and it is not stated how the gain matrix can be determined;

network availability is at risk because the central computation entity represents a single point of failure.

There are other prior art solutions on energy savings in wireless networks. Some consider switching off a group of cells, whilst others focus on specific radio access technologies characteristics, e.g. UMTS and/or use different optimization approaches. These solutions do not consider the trade-off between throughput and power consumption, and secondly do not consider the details of switching on/off individual cells.

Another drawback of the methods described above is that they are not feasible in practice. By switching group of cells according to a pattern it is not possible to flexibly address mobile users' needs in locations where non-uniform user distribution and non-uniform service demands occur. Moreover, the proposed optimization algorithms are often computationally intractable and do not scale for large cellular networks.

SUMMARY

An object of the present invention is to provide a solution which mitigates or solves the drawbacks and problems of prior art solutions. More specifically, the present invention aims to provide a decentralized algorithm for energy saving and capacity optimization in a cellular communication system.

According to a first aspect of the invention, the above mentioned objects are achieved by a method for energy saving in a cellular communication system, the cellular communication system including one or more clusters of cells, wherein each cluster comprises one or more base stations and one or more mobile stations; the method comprising the steps of exchanging, between base stations belonging to a first cluster, measurement information associated with mobile stations of the first cluster; and changing energy saving configuration for cells belonging to the first cluster based on the measurement information.

According to a second aspect of the invention, the above mentioned objects are achieved by a method in a base station, and a corresponding base station device, for energy saving in a cellular communication system, the cellular communication system including one or more clusters of cells, wherein each cluster comprises one or more base stations and one or more mobile stations; and the base station belongs to a first cluster of cells; the method comprising the steps of: receiving measurement information associated with mobile stations belonging to the first cluster from other base stations belonging to the first cluster, and determining change in energy saving configuration for cells belonging to the first cluster based on the measurement information and on measurement information associated with mobile stations belonging to cell(s) of the base station.

According to a third aspect of the invention, the above mentioned objects are achieved by a method in a base station, and a corresponding base station device, for energy saving in a cellular communication system, the cellular communication system including one or more clusters of cells, wherein each cluster comprises one or more base stations and one or more mobile stations, and the base station belongs to a first cluster of cells; the method comprising the steps of: broadcasting measurement information associated with mobile stations belonging to cells of the base station, receiving measurement information associated with mobile stations belonging to the first cluster from base stations belonging to the first cluster, and determining change in energy saving configuration for one or more cells associated with the base station based on the received measurement information.

The invention also relates to a computer program, having code means, which when run by processing means causes the processing means to execute the methods according to the present invention.

The present invention provides a solution which may be distributed between multiple clusters of base stations and therefore scales with acceptable complexity to address networks of any size. Moreover, no signaling between different clusters is required thereby reducing signaling in the communication network. Further, the present solution may be executed on-line so that adjustments to the configuration of a live network are immediately enforced once determined. According to preferred embodiments of the present invention joint optimization of energy saving and network performance aspects enables a network configuration that meets the policy needs of the operator since the operator can weigh the importance of energy saving and network performance, and the configuration is tuned to the optimum point respecting this weighting.

Further applications and advantages of the invention will be apparent from the following detailed description.

BRIEF DESCRIPTION OF THE DRAWINGS

The appended drawings are intended to clarify and explain different embodiments of the present invention in which.

DETAILED DESCRIPTION OF ILLUSTRATIVE EMBODIMENTS

Figure 1:
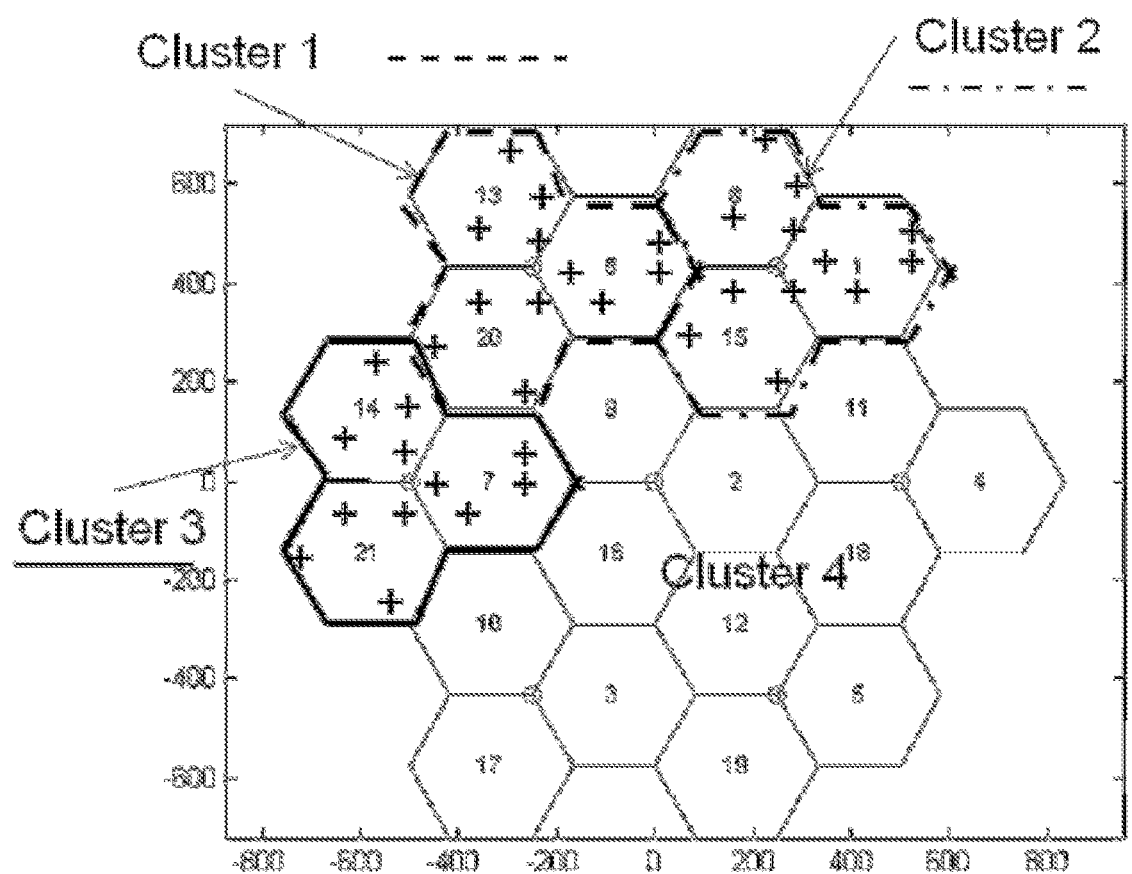
FIG. 1 illustrates a cellular communication network having a plurality off cell divided into multiple clusters.

In 3GPP RAN3, a method has been disclosed to allow a group of cells, i.e. a cluster comprising one or more base stations and one or more mobile stations, to cooperate to provide coverage compensation when one cell of the group is switched off. A cluster coordinator is defined and cells of the cluster send information to this cluster coordinator. The coordinator determines the on/off configuration of the cells and signals this back to each cell. FIG. 1 shows an example network consisting of hexagonal macro cells and pico cells (marked with crosses) in which the network of cells is divided into one or more clusters of cells. The network is divided into four clusters in this particular example. Cluster 1 comprises 3 macro cells and 12 pico cells, and likewise clusters 2 and 3. Cluster 4 consists of the remaining 12 macro cells.

The proposed 3GPP RAN3 method defines the following mechanisms and logical entities:

Proposal 1: Define Area Coverage Cluster (ACC) as the set of energy saving cells and compensating cells for which energy saving procedures are specified.

Proposal 2: ACC creation and management will be ruled and communicated from operator OAM, assigning Energy Saving Cell (ESC) or Compensation Cell (ESC) roles on the ACC.

Proposal 3: Define the ACCCO as ACC coordinator, to which cells information will be sent if needed, and from which commands or parameter set will be received for ESC algorithm control.

However, this method does not describe which parameter(s) that should be exchanged between the base station nodes. Additionally, it does not consider the best on/off configuration for all cluster of cells but the more narrow problem of which "energy saving" cells may be switched off; some cells are "compensation cells" and others are "energy saving" cells. Further, cell throughput or any other similar performance aspects are not addressed in this method.

Therefore, the present invention relates to a method for energy saving in a cellular communication system including one or more clusters of cells, wherein each cluster comprises one or more base stations and one or more mobile stations. The method comprises the steps of: exchanging, between base stations belonging to a first cluster, measurement information associated with mobile stations of the first cluster; and changing energy saving configuration for cells belonging to the first cluster based on the measurement information.

Exchanging the measurement information means that the measurement information is transferred between the base stations of the same cluster, e.g. by means of wired or wireless transmission which is well known to the skilled person. Hence, signaling exchange of measurement information takes place only within each cluster and the energy optimization is also localized according to the present invention. Cluster selection i.e. which cells belonging to which cluster is an important aspect. Larger clusters should give better performance (fewer users adjacent to cells of other clusters) but complexity needs to be acceptable. Cluster boundaries should not bisect areas of dense mobile users since inter-cluster interference is likely to be high and this cannot be managed or controlled by a cluster where it occurs.

The measurement information may relate to one or more in the group comprising:

radio signal strength;

reference signal received power (RSRP), this is an LTE measurement and represents the signal strength of the cell specific reference symbols;

pilot channel received signal code power (RSCP), this is the UMTS measurements on CCPCH channels which is also possible to use.

path loss or path gain;

channel quality measurement;

channel quality indicator (CQI), this is a measurement undertaken by mobile stations in UMTS and LTE systems and reflects the quality of the downlink channel;

signal-to-noise ratio (SNR) or signal-to-interference plus noise ratio (SINR);

data throughput; and mobile station location, since knowledge of the location of the mobile station can be used to determine path gain values, e.g. using a previously established database.

Knowledge of the bearer quality requirements such as the QoS Class Identifier (QCI) enable more elaborate utility values considering different UE classes or services.

Moreover, the measurement information may be minimization of drive testing (MDT) information. MDT has been introduced by 3GPP as a means for a commercial mobile to log measurements (such as RSRP) and later to report these to the network.

It should further be realized that the above mentioned measurement information is measured by mobile stations and/or by base stations. When the mobile stations make the measurements it is the downlink case whilst when the base stations make the measurements it is the uplink case. Combination of the uplink and downlink cases may also be used. The exchange of measurement information between the base stations can be performed by broadcasting.

Regarding the change of energy saving configuration this may involve setting or adjusting one or more in the group comprising:

cell on/off mode;

base station or base station component sleep/active mode, wherein in active state full operation is assumed while in sleep mode there is limited functionality in operation and power consumption is reduced;

discontinuous transmission (DTX) operation whereby the cell transmission is halted for short periods of time thus saving power consumption;

bandwidth reduction may be used for cells with low traffic levels such that the bandwidth of the power amplifier can be reduced so that its operation point is more efficient. Transmission of common channels and pilots across the full band is also not necessary;

power amplifier operation may be adjusted to reduce power amplifier power consumption, e.g. by reducing the peak transmission power;

transmission power which is directly correlated to power consumption; and antenna tilt adjustment can be used to adjust the coverage of a cell, thereby one cell may be switched off and its lost coverage compensated by up-tilting antennas of other cells.

It has also been realized by the inventors that the measurement information may be tagged with information relating to one or more in the group comprising: base station antenna tilt, mobile station location, and mobile station quality of service class identifier (QCI). Measurement information may be tagged with the mobile station location to help the optimization engine to build up its own database of path gain values. Tagging using antenna tilt values can assist the cluster head to identify the antenna tilt value associated with different mobile station measurements. Alternatively, measurements can be tagged with a timestamp and the network state can be determined by information exchange between nodes. To allow antenna tilt tagging the base station should advertise the current tilt value (e.g. in system information) or signal mobile stations when it is changed (or at call set-up). Measurements may be gathered by direct signaling or by MDT signaling (including logged measurements). As for the base station antenna tilt information, this information can be broadcasted by base stations and read by mobile stations according to an embodiment of the information. This is necessary such that mobile stations can add the tilt value as a tag to measurements.

According to an embodiment of the invention the measurement information associated with mobile stations moving with a speed greater than a threshold speed is not exchanged. The basic idea is to ignore mobile stations that are moving rapidly. One general comment is that for on-line optimization, or any other optimization which does not use statistics collected over a longer period it would be good to use the speed of the mobile stations to understand which mobile stations are meaningful to take into account in the optimization algorithm. With fast moving mobile stations the data used in the optimization would be outdated quickly after the on/off status of the cluster is changed. Hence, the optimization could only be made based on mobile stations with low speed with the assumption that fast moving mobile stations will stay in a coverage layer, or the presence of fast mobile stations may need to be signaled to make sure that there is a coverage layer. The speed could be estimated either by MDT positioning, mobility state information (determined by a standardized method for LTE mobile stations), mobile station handover history, or any other suitable method. Alternatively, if e.g. the RSRP values are varying too much these values could be filtered in some way, either be excluded or just averaged depending on what would be best for the optimization. Based on the transition time/cost for switching on/off a cell some conclusion about a reasonable period between vector changes can be made and from that it would also be more clear for how long measurements should be collected to provide suitable statistics for the optimization. Considering the above reasoning one preferred speed threshold value is the speed for pedestrians. However, other threshold values may be used depending on the application.

The present method may according to another embodiment further comprise the steps of: exchanging, between the base stations belonging to the first cluster, further information relating to one or more in the group comprising: cell antenna tilt, cell transmit power, and cell energy saving mode; and changing energy saving configuration for cells belonging to the first cluster based on this further information. The base station can run an optimization algorithm to determine the best energy saving configuration for the cluster, i.e. all cells in the cluster. The cell transmit power can be used to determine path loss values of mobile stations for which only signal strength measurements are available. The optimization algorithm typically only adjusts the energy saving mode of one cell at a time, so it is important to know the current energy saving status of each cell. Cell antenna tilt can be used to determine which of several measurements from a mobile station tagged with different tilt values is currently applicable.

Figure 2:
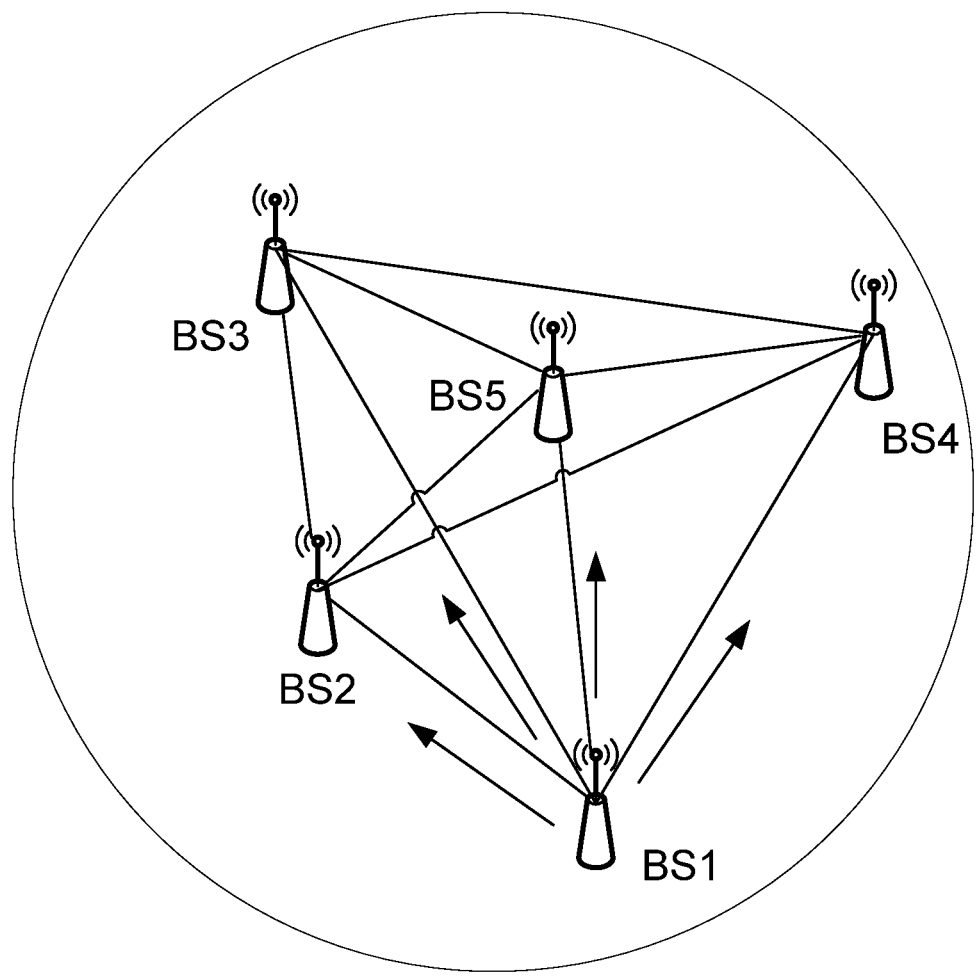
FIG. 2 illustrates an embodiment of the invention without a cluster head.
Figure 5:
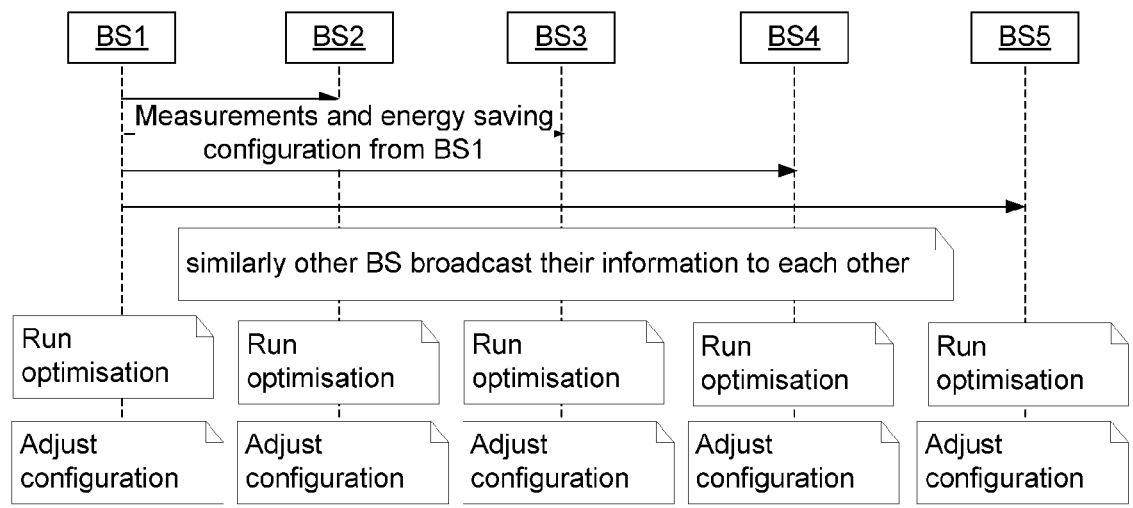
FIG. 5 illustrates a message sequence chart for a cluster without a cluster head.

Considering one cluster there are two main architectural options. In an embodiment of the invention only one cell (or an external node) acts as a cluster head or a cluster coordinator. The optimization routine to determine the optimum energy saving configuration vector/matrix for the cells of the cluster executes here. Cells in the cluster provide information to the cluster head to allow it to run the optimization and the outcome can then be passed back to each cell. The cluster head itself can also exploit its own measurements (these could e.g. be measurements performed by the mobile users attached to its own cell). FIG. 2 illustrates a solution without a cluster head. The cluster in FIG. 2 comprises five base stations, BS1, . . . , BS5. They are fully meshed so that each base station can communicate with all others (for example, over a wired interface, such as X2 or S1). In FIG. 2 base station BS1 broadcasts the measurement information that it has to all other base stations in the cluster. Other base station information may also be sent (e.g. cell energy saving mode). Other base stations do likewise (not shown). Thereby all base stations have common information and can therefore come to the same conclusion on the optimum configuration for the cluster. FIG. 5 shows a message sequence chart for a cluster without a cluster head, i.e. a headless approach. Measurements and energy saving configurations (optional) are exchanged between all base stations of the cluster (e.g. by broadcasting). Each base station then runs the optimization algorithm and comes to the same outcome on the optimum configuration of the cluster. Thereafter, each base station adjusts its configuration according to the outcome.

Figure 3:
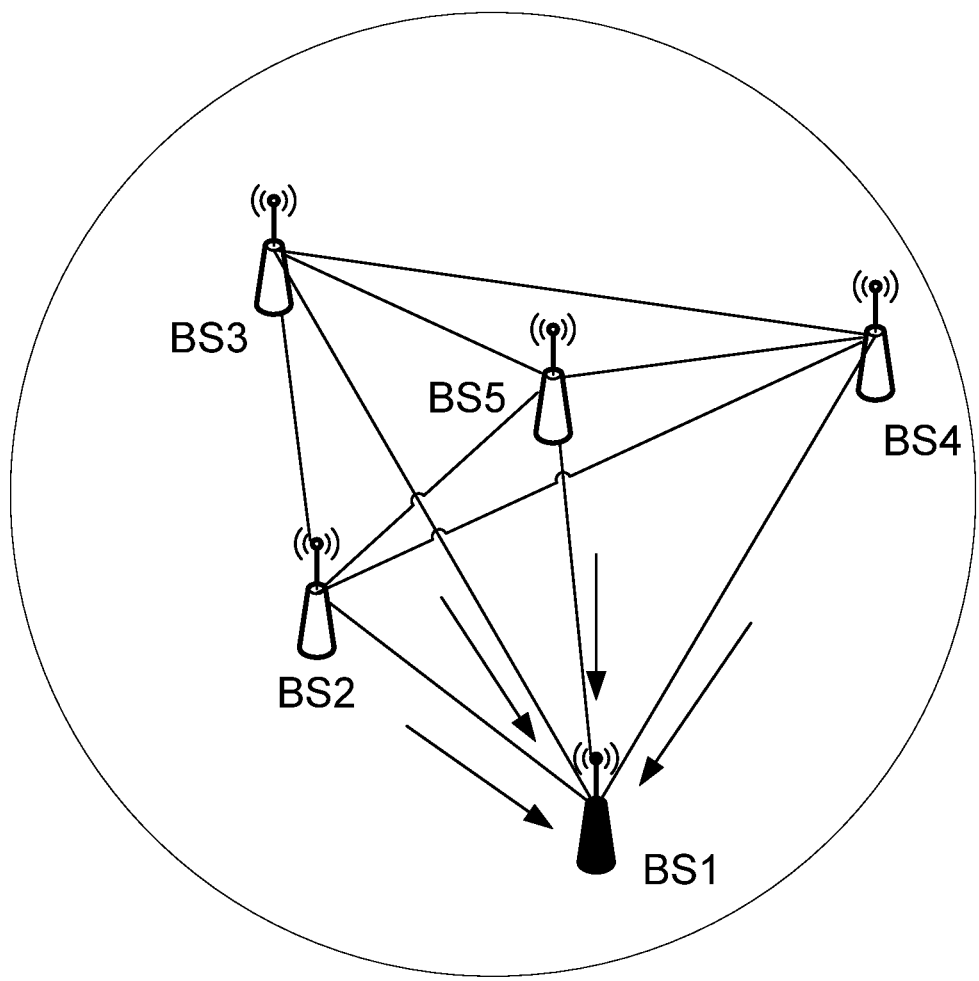
FIG. 3 illustrates an embodiment of the invention with a cluster head.
Figure 4:
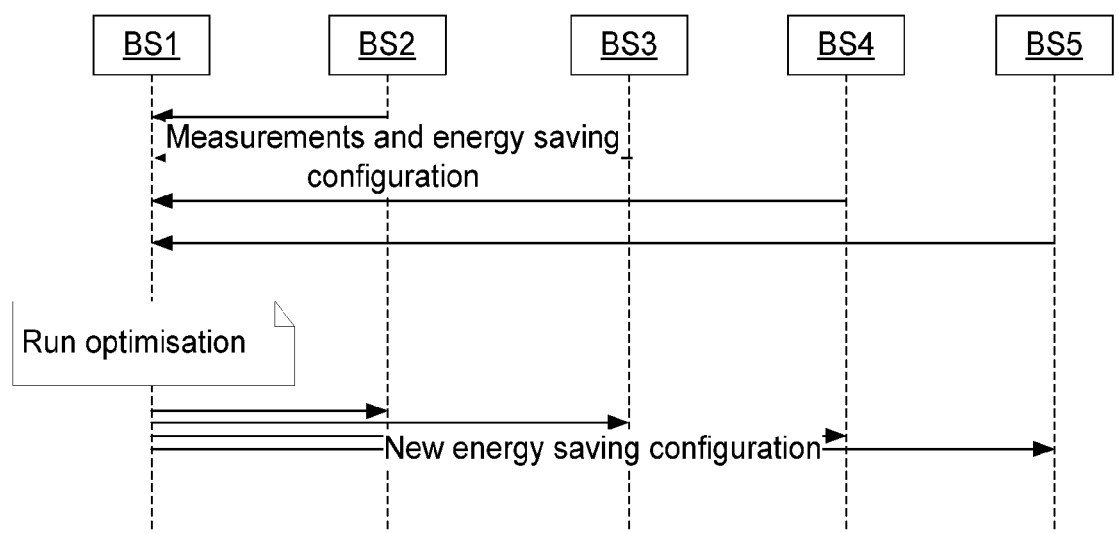
FIG. 4 illustrates a message sequence chart for a cluster using a cluster head.

In another embodiment of the invention all cells of the same cluster share measurement information which each other and then run the optimization algorithm individually. Since each cell has the same input information they all come to the same outcome. This second embodiment works well when the routine runs "on-line" so that some cells in the cluster may be switched off at the start of the optimization (having been disabled by previous optimizations). In these circumstances, with the cluster head approach the cluster head may be switched off and a new cluster head needs to be identified. The "head-less" approach avoids this complexity. So in summary, the two embodiments above means that changing the energy saving configuration is determined by a single base station of a cluster or by each base station of the same cluster. FIG. 3 illustrates an embodiment with a cluster head BS1. All relevant information, such as measurements, etc., is sent by base stations BS2, . . . , BS5 to cluster head BS1. Cluster head determines the optimum cluster configuration based on the received information and thereafter communicates any changes to other base stations (the signaling is not shown). FIG. 4 shows a message sequence chart for a cluster using a cluster head BS1. Measurements and energy saving configuration (optional) are sent to the cluster head which runs the optimization algorithm. The outcome is thereafter sent to the other base stations, BS2, . . . , BS5. If there is no configuration change required for a bases station, the message may not be sent to that base station.

Corresponding methods (and associated base station devices) for the cluster head and head-less approaches in base stations for energy saving according to the present invention therefore comprises the following steps:

Cluster head: receiving measurement information associated with mobile stations belonging to the first cluster from other base stations belonging to the first cluster, and determining change in energy saving configuration for cells belonging to the first cluster based on the measurement information;

Head-less: broadcasting measurement information associated with mobile stations belonging to cells of the base station, receiving measurement information associated with mobile stations belonging to the first cluster from base stations belonging to the first cluster, and determining change in energy saving configuration for one or more cells associated with the base station based on the received measurement information.

Changing the energy saving configuration may involve: minimizing base station energy consumption. However, according to another preferred embodiment of the invention changing the energy saving configuration may involve joint optimization of base station energy consumption AND one or more in the group comprising: mobile station energy consumption, mobile station quality of service, cell throughput and cell edge throughput. In the joint optimization the algorithm considers more than one performance indicator, for example, energy consumption AND cell edge throughput. Clearly minimum energy consumption occurs with all cells switched off but cell edge throughput is then zero. The joint optimization weights the performance indicators in some way to determine the best overall state. For example, a utility that weights energy consumption and cell edge throughput could be used. The objective is to maximize this utility value.

The optimization maximizes the cluster utility: this is the utility calculated over the cells of the cluster only (and the mobile stations attached there). The maximization is only able to adjust the energy saving status (e.g. on/off, sleep mode, power) status for cells of the cluster.

An example of joint optimization of energy saving and throughput is given below. The configuration of the entire cluster of L cells can be defined in terms of a transmit indicator vector h and a power transmit vector p as given by $$h=(h_1, \ldots, h_K, h_{K+1}, \ldots, h_L) \quad (1),$$

$$p=(p_1, \ldots, p_K, p_{K+1}, \ldots, p_L) \quad (2),$$

where $p_c$ and $h_c$ are the power transmit and the power on/off state configuration of cell, respectively, and cell edge user throughput and energy consumption ratio are combined into a single aggregate objective (utility) function f in which the utility value of the current working configuration (on/off vector) $h_w$ is calculated relatively to a baseline reference configuration where all cells are switched on $h_r$ as the weighted sum $$f(p_w, p_r) = \alpha \cdot \frac{O_w}{O_r} + (1-\alpha) \cdot G(p_w, p_r), \quad (3)$$

where f corresponds to the objective function; coefficient $\alpha$, $0 \leq \alpha \leq 1$ is a weight indicating the significance of the terms. The first term is defined by the ratio of the outage (or cell edge) throughput of the current configuration $O_w$ over the outage throughput of the baseline configuration $O_r$. The second term, corresponds to the Energy Reduction Gain (ERG) G and is defined based on the ratio of the ECR of current configuration $E(p_w)$ over the ECR of the baseline configuration $E(p_r)$ $$G(p_w, p_r) = 1 - \frac{E(p_w)}{E(p_r)}. \quad (4)$$

Given the above metrics the optimization problem is to $$\max f(p_w, p_r) \quad (5)$$

In addition one or more constraints can be added such that the received signal strength for each mobile station is greater than threshold value(s). This method assumes that the interference from transmissions outside the cluster will be approximately the same after the cluster has changed its energy saving status. To assist this when there are multiple clusters running local optimizations it is beneficial to stagger their optimizations so that only one cluster changes its configuration at a time. Such coordination could exploit signaling between clusters (e.g. token passing) or OAM control.

To include uplink throughput values in the utility, the interference from out-of-cluster mobile stations can be measured at each base station. Hence, the measurement information may also relate to measurements of radio transmission interference from cells and/or mobile stations outside the first cluster. The present method is suited to on-line execution with a live network and the cluster should immediately make adjustments suggested by the optimization.

To give more thorough understanding of the present invention the following exemplary implementation of joint optimization of base station power consumption and downlink throughput values is discussed:

A cluster head gathers measurement information associated with only active mobile stations (no idle mode) within the cells of a first cluster:

RSRP values from each (cluster) mobile station for the cells of other clusters (extra-cluster cells) that it can detect (essentially this enables to calculate the path gain or path loss for the mobile stations in the cluster given the transmit powers of cells outside the cluster; path gain is set to zero for undetectable cells).

One way of looking at this aspect is as a means to capture the current out-of-cluster interference for each mobile station in the cluster.

Another approach to determine out-of-cluster interference would be for the mobile station to report the CQI and the cluster head could thereafter calculate the interference from cells outside the first cluster (requires knowledge of scheduling for all cells in the cluster, and CQI measurement timing). This method is truly local knowledge which means that the algorithm does not need to have information about other clusters (such as transmit powers). Alternatively, the mobile station could measure the out-of-cluster interference directly, such a measurement is however not in current 3GPP wireless standards.

RSRP values from each (cluster) mobile station to each cell of the first cluster.
  Note this may require momentary switching on of cells which were previously off if measurement values are not available or are out-dated. Alternatively, the mobile station receiver of a switched off cell can be used to estimate the path loss by measuring the strength of uplink transmissions.
  Also needs to know the maximum transmit power of cells outside the cluster that for the out-of-cluster interference calculation described above—this could be configured by the OAM.

The cluster heads determines/calculates the cluster utility and uses this to guide the optimization.
  Cluster utility uses e.g. on/off status for each cell in the cluster to determine power consumption, mobile station cell association (i.e. to which cell each mobile station in the cluster attaches) and mobile station throughput values.

Furthermore, the present optimization method may be applied in different scenarios. Here are some further considerations:
  Dynamic configuration, given the current mobile station configuration what is the best network configuration, e.g. on/off mode, antenna tilt, etc.
  When traffic increase in an area where some cells are switched off, the question is whether to switch on some cells or tilt antennas, etc.
  Busy hour adaptation which is the same problem as in the dynamic configuration but uses some average user/traffic distribution. It is also possible to use multiple snap shots and look at the frequency of each cell being switched on to determine the best on/off vector. For example, run 10 snap shots and decide to switch on cells that were recommended to be ON for three or more of the snap shots.
  Cluster utility exchange during distributed optimization—cluster A makes an adjustment and cluster B then measures the impact on itself and passes this to Cluster A. Another more signaling related aspect would be to signal some metric of the effect of optimization in the neighbour cluster, i.e. the optimizing cluster would get feedback from its neighbour clusters about their change in cluster utility (maybe throughput change would be enough) due to the change it has made. The optimizing cluster could request neighbour clusters to start measurements and report back. That could help to reach a global optimum for the network.

Furthermore, as understood by the person skilled in the art, any method according to the present invention may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, the above described base stations and mobile stations have suitable functions and are therefore arranged to fulfill the requirements of different wireless communication standards such as 3GPP standards or WiMax, etc. Hence, the base stations may e.g. be eNBs and the mobile stations may be UEs.

Finally, it should be understood that the present invention is not limited to the embodiments described above, but also relates to and incorporates all embodiments within the scope of the appended independent claims.

What is claimed is:

1. A method for energy saving in a cellular communication system, the cellular communication system including one or more clusters of cells, wherein each cluster comprises one or more base stations and one or more mobile stations, and wherein a first cluster comprises more than two base stations, the method comprising:
  exchanging measurement information associated with mobile stations of the first cluster, the measurement information being exchanged between the base stations belonging to the first cluster;
  simultaneously determining, by a base station of the first cluster who has received measurement information from all the base stations belonging to the first cluster, a best energy saving configuration for all cells in the first cluster using measurement information of all the base stations belonging to the first cluster; and
  changing energy saving configuration for cells belonging to the first cluster based on the determined best energy saving configuration.

2. The method according to claim 1, wherein the measurement information relates to one or more items selected from the group consisting of radio signal strength, reference signal received power (RSRP), pilot channel received signal code power (RSCP), channel quality measurement, channel quality indicator (CQI), signal-to-noise ratio (SNR), signal-to-interference plus noise ratio (SINR), data throughput, and mobile station location.

3. The method according to claim 1, wherein the measurement information relates to measurements of radio transmission interference from cells and/or mobile stations outside the first cluster.

4. The method according to claim 1, wherein the measurement information is measured by mobile stations and/or by base stations.

5. The method according to claim 4, wherein the measurement information is tagged with information relating to one or more items selected from the group consisting of base station antenna tilt, mobile station location, and mobile station quality of service class identifier (QCI).

6. The method according to claim 1, wherein the measurement information is minimization of drive testing (MDT) information.

7. The method according to claim 1, wherein measurement information associated with mobile stations moving with a speed greater than a threshold speed is not exchanged.

8. The method according to claim 1, further comprising:
  exchanging further information between the base stations belonging to the first cluster, the further information relating to one or more items selected from the group consisting of cell antenna tilt, cell transmit power, and cell energy saving mode; and changing energy saving configuration for cells belonging to the first cluster based on the further information.

9. The method according to claim 1, wherein the exchanging comprises broadcasting, by the base stations belonging to the first cluster, the measurement information.

10. The method according to claim 1, wherein changing the energy saving configuration comprises minimizing base station energy consumption.

11. The method according to claim 1, wherein changing the energy saving configuration comprises joint optimization of base station energy consumption and one or more of mobile station energy consumption, mobile station quality of service, cell throughput and cell edge throughput.

12. The method according to claim 1, wherein the best energy saving configuration is determined by a single base station of the first cluster or by each base station of the first cluster.

13. The method according to claim 12, wherein each base station is arranged to determine the same energy saving configuration if the energy saving configuration is determined by each base station of the first cluster.

14. The method according to claim 1, wherein changing the energy saving configuration involves setting or adjusting one or more of cell on/off mode, base station or base station component sleep/active mode, discontinuous transmission (DTX) operation, bandwidth reduction, power amplifier operation, transmission power, and antenna tilt.

15. The method according to claim 1, wherein exchanging the measurement information is performed over a wired communication interface, such as X2 or S1.

16. A non-transitory computer-readable medium that stores a computer program that, when run by a computer device, causes the computer device to execute the method according to claim 1.

17. The non-transitory computer-readable medium according to claim 16, wherein the computer-readable medium comprises a memory selected from the group consisting of a ROM (Read-Only Memory), a PROM (Programmable ROM), an EPROM (Erasable PROM), a Flash memory, a EEPROM (Electrically EPROM) and a hard disk drive.

18. A base station configured to operate in a cellular communication system, the cellular communication system including one or more clusters of cells, wherein each cluster comprises a plurality of base stations and a plurality of mobile stations, the base station belonging to a first cluster of cells, the base station comprising:

a processor; and
a computer-readable storage medium storing a program to be executed by the processor, the program including instructions for:
exchanging measurement information associated with mobile stations of the first cluster, the measurement information being exchanged between the base station and other base stations belonging to the first cluster, wherein exchanging measurement information comprises:
receiving, by the base station, measurement information from all other base stations belonging to the first cluster; and
sending, by the base station, measurement information to all other base stations in the first cluster;
after receiving the measurement information from all other base stations in the first cluster and after sending the measurement information to all other base stations in the first cluster, simultaneously determining a best energy saving configuration for all cells in the first cluster using measurement information of all base stations in the first cluster; and
changing an energy saving configuration for cells belonging to the first cluster based on the determined best energy saving configuration.

19. A base station arranged for communicating in a cellular communication system, the cellular communication system including one or more clusters of cells, wherein each cluster comprises a plurality of base stations and a plurality of mobile stations, the base station belonging to a first cluster of cells, wherein the first cluster comprises more than two base stations, the base station configured to:
receive measurement information associated with mobile stations belonging to the first cluster from all other base stations belonging to the first cluster;
sequentially send measurement information of the base station to all other base stations in the first cluster;
simultaneously determine a best energy saving configuration for all cells in the first cluster based on the received measurement information and on measurement information associated with mobile stations belonging to cells of the base station; and
determine a change in energy saving configuration for cells belonging to the first cluster based on the determined best energy saving configuration .

20. The base station according to claim 19, wherein the first cluster does not include a base station whose coverage area completely overlaps coverage areas of all other base stations belonging to the first cluster.

* * * * *